Patented July 14, 1942

2,289,534

UNITED STATES PATENT OFFICE 2,289,534

PROCESS FOR PRODUCING ACROLEIN

Hans Wagner, Frankfort-on-the-Main, Germany, assignor, by mesne assignments, to Chemical Marketing Company, Inc., New York, N. Y.

No Drawing. Application July 22, 1939, Serial No. 285,966. In Germany August 9, 1938

5 Claims. (Cl. 260—601)

The present invention relates to a process for producing acrolein.

It is known that it is possible to produce acrolein by the condensation of acetaldehyde and formaldehyde. By means of these reactions, a mixture is obtained which in addition to acrolein as main product, also contains unchanged formaldehyde and acetaldehyde, a little crotonaldehyde, methanol and in some cases water. If this raw mixture is further treated by means of distillation or fractionation, difficulties are experienced in that on the bottoms of the columns, in the connecting tubes (Ubergangsbogen), and in the coolers, solid substances are deposited which among others contain paraformaldehyde. These deposits not only cause difficulties in the operation but also detrimentally influence the fractionation.

It has now been found that the treatment of the raw mixtures can be carried out in a very simple and advantageous manner by subjecting the raw mixture in the form of vapor to a partial condensation.

When raw mixtures of the condensation products of the reaction between acetaldehyde and formaldehyde are treated in accordance with the principles of the present invention after the first condensation a mixture is obtained which contains the major portion of the unchanged formaldehyde. On the other hand, the final condensate contains in addition to acrolein and unchanged acetaldehyde only small amounts of formaldehyde so that a further fractionation of this condensate may be carried out without difficulty.

It is an object of the present invention to provide an improved process for the manufacture of acrolein by the condensation of acetaldehyde and formaldehyde.

It is another object of the present invention to provide a process for the manufacture of acrolein by the condensation of acetaldehyde and formaldehyde wherein reaction products of low melting point are removed from the reaction mixture before separating the major portion of the acrolein.

It is a further object of the present invention to provide a process for the manufacture of acrolein by the condensation of acetaldehyde and formaldehyde in which the condensation of the reaction products is carried out in two steps.

It is also within the contemplation of the present invention to provide an improvement in the process of manufacturing acrolein by the condensation of acetaldehyde and formaldehyde in which the major portion of the unreacted formaldehyde is removed in a preliminary condensation.

Other objects and advantages of the present invention will become apparent from the following description of a preferred embodiment.

In general, a partial condensation may be carried out in any desired manner. Thus, for example, the vapors of the raw mixture may be carried first through one or more condensation chambers which are heated to such high temperature that only a partial condensation is effected therein. Preferably, the temperatures of these preliminary condensers are maintained higher than the boiling temperature of acrolein. It has been found in practical operation that for this purpose temperatures are to be maintained which are above the boiling point of water, more particularly, temperatures which are 5 to 40° higher than the boiling point of water at the condensation pressure. The mixture rich in formaldehyde obtained by the preliminary condensation may be further treated by fractionation in conventional manner, for example by vacuum or pressure fractionation, to obtain solid formaldehyde or formaldehyde solution of high concentration which may be returned into the production. Instead of such preliminary condensers, it is also possible to employ columns for the partial condensation. In this case the mixture in the form of vapor is introduced into the lower portion of a column heated to a temperature above the boiling point of water, while the said condensate rich in formaldehyde is withdrawn as the reflux and is further treated.

The portions which remain in the form of vapor during the condensation, are further treated, if desired atfer a complete condensation in a further fractionating apparatus, to pure acrolein or to acrolein of high concentration. The unchanged acetaldehyde obtained at this point is likewise returned to the production.

The partial condensation may be carried out at any desired pressure. Generally, the process will be carried out at atmospheric pressure, although, if desired, the results obtainable by the invention may be further improved by carrying out the partial condensation under reduced pressure.

When the process of the present invention is applied to treating raw mixtures of formaldehyde, acetaldehyde and acrolein in the vapor form obtained by gas catalysis of formaldehyde-acetalydehyde mixtures to form acrolein, it is preferably carried out in such a manner that the obtained raw mixture in vapor form is immediately subjected to partial condensation in accordance with the present invention.

*Example*

68 grams of formaldehyde and 100 grams of acetaldehyde are conducted in 5 hours over a stationary catalyst at a temperature of 285° C. The reaction mixture in the form of vapor which is here obtained is first passed through a condensation chamber which is maintained at a temperature of 107°. The portion remaining in vapor form is well cooled and is completely condensed. In this case, during the warm, preliminary condensation, ⅓ of the total catalized product is obtained having the following composition: 13 to 19% HCHO, 1 to 2% crotonaldehyde, rest H₂O.

The mixture obtained by the final condensation consists of 19 to 21% acrolein, 1 to 2% CH₃OH, 0.5 to 1% crotonaldehyde, 20 to 23% acetaldehyde, 3 to 4% HCHO. The final condensate obtained is subsequently fractionated and acrolein with a content of 80 to 85% is obtained, distilling off between 23½° to 65°.

The results obtainable by means of the invention could not be predicted. As is well known, formaldehyde solution can be concentrated or enriched only to a very slight extent by means of simple distillation. On the other hand, in accordance with the invention it is possible to obtain such a far-reaching separation by means of a simple preliminary condensation that at least the difficulties outlined in the introduction are eliminated.

Although the present invention has been described in conjunction with certain particular embodiments thereof, variations and modifications can be made as those skilled in the art readily understand. It is to be understood that such variations and modifications are to be considered within the purview of the present specification and the scope of the appended claims.

I claim:

1. A process for recovering acrolein from vaporous mixtures containing acrolein, formaldehyde and water which comprises subjecting a vaporous mixture containing acrolein, formaldehyde, crotonaldehyde, acetaldehyde, methyl alcohol and water to a preliminary condensation at a temperature of about 107° C. to obtain a first condensate and residual vapors, said first condensate having a volume about ⅓ of the volume of the aforesaid vaporous mixture in the condensed state, and said first condensate containing about 13 to about 19% formaldehyde, about 1 to about 2% crotonaldehyde and the remainder water, condensing the aforesaid residual vapors to obtain a final condensate containing about 19 to about 21% acrolein, about 1 to about 2% methyl alcohol, about 0.5 to about 1% crotonaldehyde, about 20 to about 23% acetaldehyde and about 3 to about 4% formaldehyde and fractionating said final condensate to obtain 80 to 85% acrolein distilling between 23.5° C. and 65° C.

2. A process for recovering acrolein from vaporous mixtures containing acrolein, formaldehyde and water which comprises subjecting a vaporous mixture containing acrolein, formaldehyde and water to a preliminary condensation at a temperature of about 107° C. to obtain a first condensate containing the major portion of the formaldehyde of the aforesaid vaporous mixture and residual vapors and subjecting said residual vapors to condensation to obtain a second condensate containing only a minor portion of the formaldehyde of the aforesaid vaporous mixture and substantially all of the acrolein of the aforesaid vaporous mixture.

3. A process for recovering acrolein from vaporous mixtures containing acrolein, formaldehyde and water which comprises subjecting a vaporous mixture containing acrolein, formaldehyde and water to a preliminary condensation at temperatures about 5° C. to about 40° C. above the boiling point of water at the condensation pressure to obtain a first condensate containing the major portion of the formaldehyde of the aforesaid vaporous mixture and residual vapors containing a minor portion of the formaldehyde and a major portion of the acrolein of the aforesaid vaporous mixture and subjecting said residual vapors to condensation to obtain a second condensate containing substantially all the acrolein of the aforesaid vaporous mixture and only a minor portion of the formaldehyde of the aforesaid vaporous mixture.

4. A process for recovering acrolein from vaporous mixtures containing acrolein, formaldehyde and water which comprises subjecting a vaporous mixture containing acrolein, formaldehyde and water to a preliminary condensation at temperatures about 5° C. to about 40° C. above the boiling point of water at the condensation pressure to obtain a condensate and residual vapors, said condensate having a volume about ⅓ the volume of the aforesaid vaporous mixture in the liquid state and containing a major portion of the formaldehyde of the aforesaid vaporous mixture, said residual vapors containing only a minor portion of the formaldehyde of the aforesaid vaporous mixture and a major portion of the acrolein of the aforesaid vaporous mixture and condensing said vaporous mixture to obtain a second condensate containing substantially all of the acrolein of the aforesaid vaporous mixture.

5. In the process of producing acrolein by the reaction between acetaldehyde and formaldehyde at elevated temperatures in the presence of a catalyst to obtain a vaporous mixture of reaction products and reactants containing acrolein, formaldehyde and water the improvement which comprises subjecting the aforesaid vaporous mixture of reaction products and reactants containing acrolein, formaldehyde and water to a preliminary condensation at a temperature of about 107° C. to obtain a first condensate containing the major portion of the formaldehyde of the aforesaid vaporous mixture and residual vapors containing only a minor portion of the formaldehyde and a major portion of the acrolein of the aforesaid vaporous mixture, condensing said residual vapors to obtain a second condensate containing only a minor portion of the formaldehyde of the aforesaid vaporous mixture and substantially all of the acrolein of the aforesaid vaporous mixture and fractionally distilling said second condensate to obtain an acrolein condensate having an acrolein content of about 80 to about 85% distilling off at about 23.5° C. to about 65° C.

HANS WAGNER.